United States Patent [19]

Ossyra

[11] Patent Number: 4,750,370
[45] Date of Patent: Jun. 14, 1988

[54] ORIFICE PLATE ASSEMBLY

[75] Inventor: John D. Ossyra, Friendswood, Tex.

[73] Assignee: Amoco Corporation, Chicago, Ill.

[21] Appl. No.: 888,038

[22] Filed: Jul. 18, 1986

[51] Int. Cl.$^4$ ............................................. G01F 1/42
[52] U.S. Cl. .................................................. 73/861.61
[58] Field of Search ................. 73/861.61, 861.62; 138/44, 45; 277/207 R, 207 A, 211; 285/328, 917

[56] References Cited

U.S. PATENT DOCUMENTS

| | | | |
|---|---|---|---|
| 1,248,057 | 11/1917 | Bailey | 138/44 |
| 1,731,404 | 10/1929 | Wetherill | 138/44 |
| 1,904,333 | 4/1933 | Smith, Jr. | 138/44 X |
| 1,946,319 | 2/1934 | Hodgson et al. | 73/861.62 |
| 2,252,337 | 8/1941 | Worthen | 73/861.61 X |
| 2,803,962 | 8/1957 | West | 73/861.61 |
| 3,151,869 | 10/1964 | Butcher | 277/211 X |
| 3,284,112 | 11/1966 | Martin | 285/328 |
| 3,715,870 | 2/1973 | Guzick | 138/44 X |

Primary Examiner—Herbert Goldstein
Attorney, Agent, or Firm—Thomas W. Tolpin; William H. Magidson; Ralph C. Medhurst

[57] ABSTRACT

An effective and efficient orifice plate is provided to accurately and safely measure the flow rate of gases and liquids. Advantageously, the orifice plate prevents leakage, spillage, and dripping of hot hydrocarbon liquids and gases and other fluids. To this end, the orifice plate comprises an annular disk with special front and back surfaces. The special front and back surfaces have a flat fluid-engaging barrier portion which contact the fluid stream about the flow passageway and have a grooved portion which extends radially outwardly of the flat portion to effectively seal and abut against one or more seals or gaskets.

11 Claims, 5 Drawing Sheets

ORIFICE PLATE ASSEMBLY

BACKGROUND OF THE INVENTION

This invention pertains to flow detectors and, more particularly, to orifice plates for measuring fluid flow.

Pipelines are used to convey numerous types of fluids such as natural gas (methane) and other light hydrocarbon gases, steam, hydrogen sulfide, ammonia, and other gases, as well as gasoline, oil, petrochemical feedstocks, water, and other liquids.

Flow detectors, such as orifice plates, are widely used to measure the flow rate of the fluid in the pipeline in order to monitor and control the flow rate, efficiency and effectiveness of the process, refinery, or equipment utilizing the pipeline. Orifice plates are usually mounted between orifice flanges and one or more seals or gaskets and installed between similar size pipes. Orifice plates customarily have a constricted opening that is smaller than the adjacent pipes to which they are attached in order to increase the flow and velocity of the fluid as it passes through the orifice plate. By knowing the inside diameter of the orifice hole and the adjacent pipes, and detecting (sensing) the difference in pressure of the fluid entering and exiting the orifice plate, the flow rate of the fluid can be accurately measured.

Over the years a variety of orifice plates, orifice flanges, seals, and gaskets have been suggested. Typifying these prior art orifice plates, orifice flanges, seals, and gaskets, as well as other devices, are those shown in U.S. Pat. Nos. 1,133,320; 1,248,058; 1,648,708; 1,805,236; 1,869,577; 2,148,101; 2,269,486; 2,520,089; 2,979,732; 3,750,710; 3,930,656; 3,983,903; and 4,357,863. These prior art orifice plates, orifice flanges, seals, gaskets, and other devices have met with varying degrees of success.

Many conventional orifice plate assemblies, however, leak during usage. This can present a dangerous situation and hazard in oil refineries, petrochemical plants, and downstream pipelines where a substantial amount of pipes are used to transport large quantities of hot hydrocarbon streams in excess of 500° F. Such leakage can scald and injure operating personnel, create a hazardous spill, pollute the soil and groundwater, create explosive conditions, and cause undesired toxic emissions into the atmosphere.

It is, therefore, desirable to provide an improved orifice plate assembly which overcomes most, if not all, of the above problems.

SUMMARY OF THE INVENTION

An improved orifice plate assembly is provided which accurately measures the flow rate of a fluid, such as oil, gasoline, petrochemicals, water, and other liquids, as well as natural gas (methane) and other light hydrocarbon gases, hydrogen sulfide, ammonia, steam, and other gases.

Advantageously, the novel orifice plate assembly is efficient, effective, and safe. It helps prevent pollution, spills, leakage, and injury to operating personnel and helps maintain the quality of the surrounding environment and atmosphere. It was unexpectedly and surprisingly found that the novel orifice plate assembly substantially prevented dripping, drainage, and other leakage of hot hydrocarbons and other fluids both above and below 500° F.

Desirably, the orifice plate assembly is easy to use, relatively inexpensive to manufacture, and simple to install.

To this end, the novel orifice plate comprises a circular disk, an inner flow passageway, and a special front and/or back surface. The special front and back surfaces have a substantially planar or flat fluid stream-engaging portion about the flow passageway which provides a fluid-resistant barrier wall and have a grooved seal- or gasket-engaging portion which extends radially outwardly of the fluid stream-engaging portion to effectively seal and abut against one or more seals or gaskets.

In one embodiment, the grooved seal-engaging portion of the orifice plate comprises an array of ridges which extend laterally outwardly of the flat portion of the disk. In another embodiment, the grooved seal-engaging portion comprises a pattern of grooves or recesses which extend laterally inwardly of the flat portion of the disk. In the preferred form, the grooved seal-engaging portion of the orifice plate comprises a set of circular grooves for enhanced sealing characteristics.

The orifice plate can have a handle which extends radially outwardly of the disk to facilitate handling of the orifice plate. The handle can have a hole to hang or otherwise store the orifice plate without notching the flow passageway.

Various types and configurations of flow passageways can be used in the orifice plate, such as a concentric flow passageway, an eccentric flow passageway, an arcuate segmental flow passageway, a chamfered quadrant edge, etc. More than one flow passageway can be used in the orifice plate, such as an overhead vent hole to facilitate passage of gases, or a lower drain hole to facilitate passage of particulates or other solids contained in the fluid stream.

In the preferred form, the orifice plate is mounted between spiral-wound metallic gaskets and grooved orifice flanges and the grooved orifice flanges are connected to differential pressure sensors.

A more detailed explanation of the invention is provided in the following description and appended claims taken in conjunction with the accompanying drawings.

DETAILED DESCRIPTION OF THE PREFERRED EMBODIMENTS

Referring to FIGS. 1-4 of the Drawings, an orifice plate assembly or system 20 is mounted and secured to and between, as well as includes, an inlet upstream pipe or tube 22 and an outlet downstream pipe or tube 24 of a pipeline upstream, within or downstream of an oil refinery to accurately detect, measure, and monitor the flow rate of the fluid passing through the pipes. In the illustrative embodiment, the inside diameter and axial flow passageways of the inlet and outlet pipes are of the same diameter.

A fluid stream of hot liquid hydrocarbons at a temperature of at least 500° F. is pumped through the pipes and orifice plate assembly. The liquid hydrocarbons in the fluid stream can comprise crude oil, intermediate refinery liquids, or refinery products, including but not limited to gasoline, oil, petrochemicals, water, caustic solutions, acid solutions, or salt solutions (brine). The fluid stream can also contain gases, such as natural gas (methane) or other light hydrocarbon gases (ethane, propane, butane, etc.), ammonia, hydrogen sulfide, steam, air, nitrogen, hydrogen, carbon dioxide, etc., and may contain solids, such as asphaltenic solids or other particulates. While the preferred fluid stream comprises gasoline or oil, the flow rates of other liquids and gaseous fluids, as well as liquid hydrocarbons and fluids below 500° F., can also be successfully measured with the orifice plate assembly.

The orifice plate assembly has an inlet, upstream orifice flange 26, an outlet, downstream orifice flange 28, an inlet, upstream, spiral wound, metallic gasket or seal 30, an outlet downstream, spiral-wound, metallic gasket or seal 32, a generally circular orifice plate 34, and fasteners 36 which compressively engage, sandwich, and securely mount the orifice flanges, gaskets, and orifice plate together. The orifice plate assembly also is operatively connected to and includes a differential pressure flow indicator, detector, transmitter, and sensing assembly 38 (FIG. 3).

Figure 1:
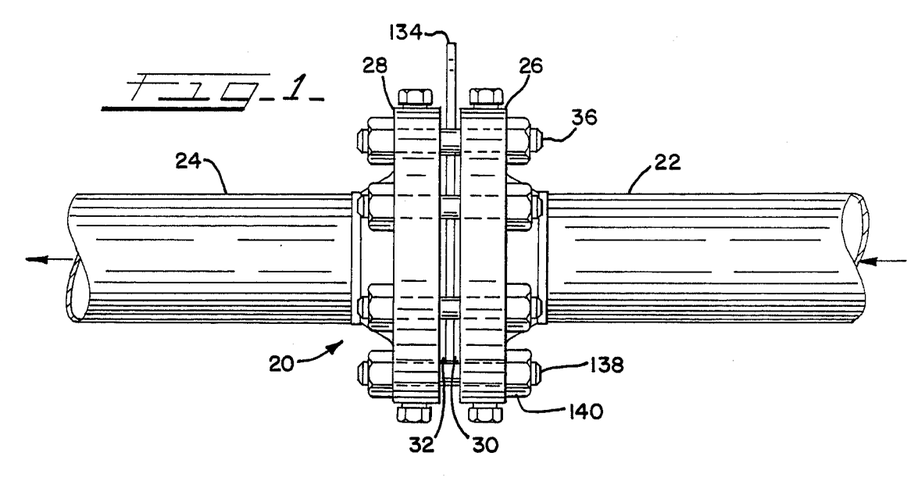
FIG. 1 is a fragmentary view of a pipeline containing an orifice plate assembly in accordance with principles of the present invention.
Figure 2:
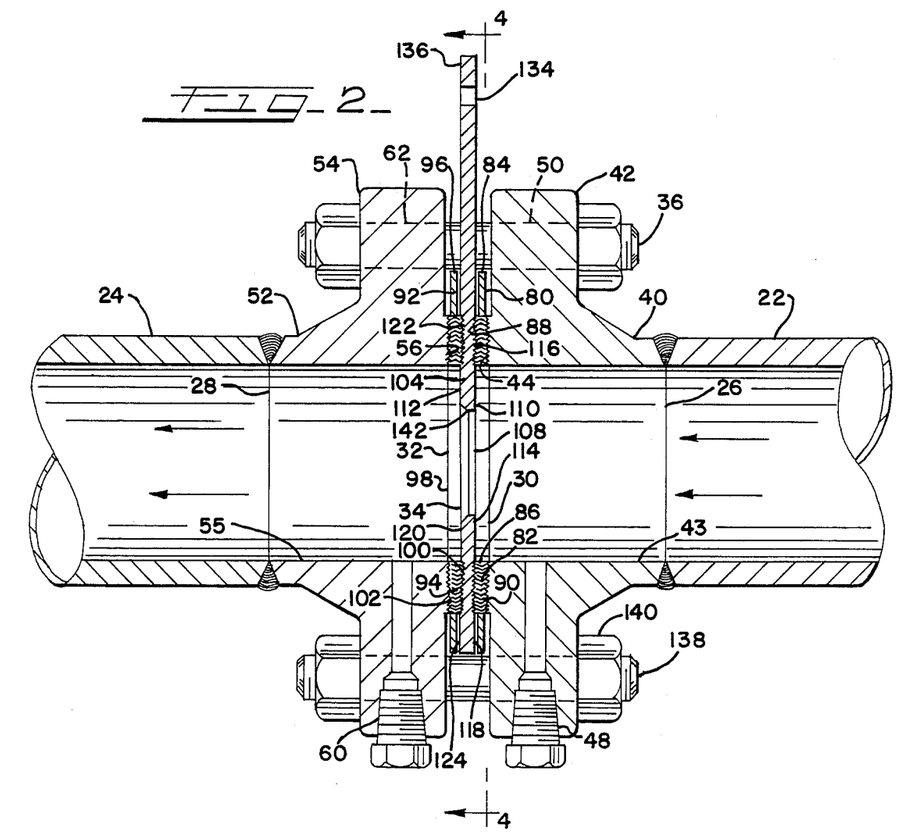
FIG. 2 is a cross-sectional view of the orifice plate assembly.
Figure 3:
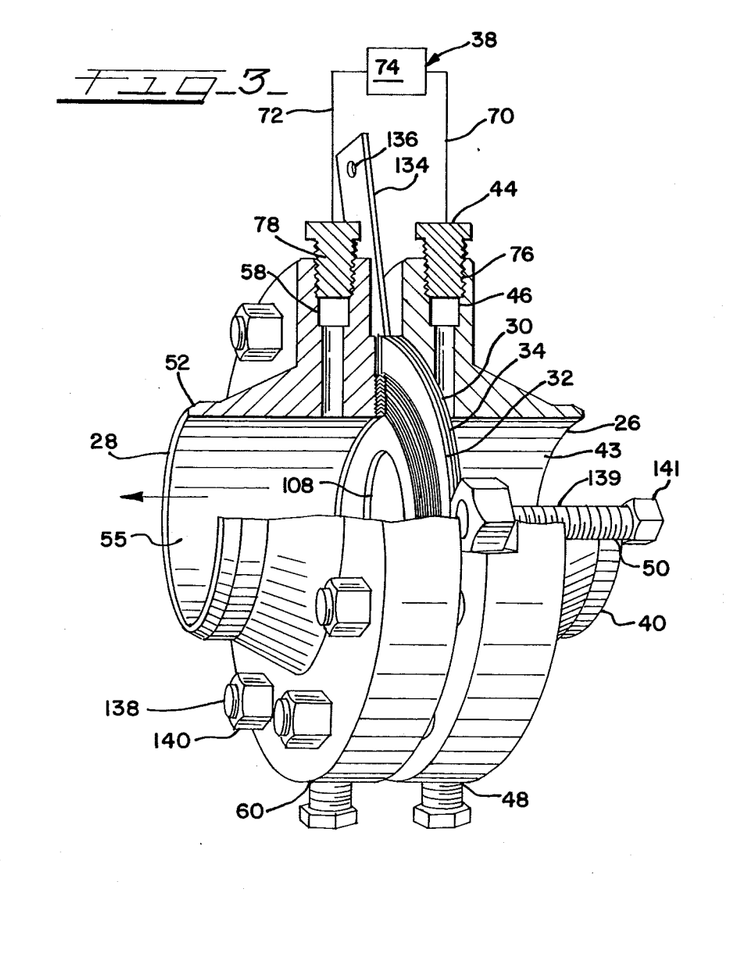
FIG. 3 is a perspective view of the orifice plate assembly with portions broken away for ease of understanding and clarity.

As best shown in FIGS. 2 and 3, the inlet orifice flange 26 has an upstream hub 40 and an inlet, upstream flange portion 42. The inlet hub extends inwardly outwardly from the the inlet flange portion in a direction opposite and facing the direction of flow of the fluid stream in the inlet pipe. The beveled (chamfered) end of the inlet hub is welded or otherwise securely fastened to the beveled end of the inlet pipe and has an inside diameter and inlet passageway 43 the same size as the inside diameter of the inlet pipe. The inlet flange portion extends radially outwardly of the inlet hub and has an inlet, upstream gasket-engaging surface 44. The inlet flange portion has a pair of diametrically opposite, radial, inlet, upstream, partially internally threaded, plug-receiving openings 46 and 48, and a set of inlet, upstream, circumferentially spaced, axial stud holes 50. The inlet gasket-engaging surface faces downstream and has a grooved inlet surface finish ranging from about 125 microinch to about 500 microinch.

The outlet orifice flange 28 (FIGS. 2 and 3) has an outlet downstream hub 52 and outlet, downstream flange portion 54. The outlet hub extends outwardly from the outlet flange portion in a concurrent direction with the fluid stream in the outlet pipe. The beveled (chamfered) end of the outlet flange portion is welded or otherwise securely fastened to the beveled end of the outlet pipe and has an inside diameter and outlet passageway 55 the same size as large as the inside diameter of the outlet pipe. The outlet flange portion extends radially outwardly of the outlet hub and has an outlet downstream gasket-engaging surface 56. The outlet flange portion has a pair of diametrically opposite, radial, outlet, downstream, partially internally threaded, plug-receiving openings 58 and 60, and a set of outlet, downstream, circumferentially spaced, axial stud holes 62 which are aligned in registration with the inlet axial stud holes. The outlet gasket-engaging surface faces upstream and has a grooved outlet, downstream-facing surface finish ranging from about 125 microinch to about 500 microinch.

The flow indicator, detector, and sensing assembly 38 (FIG. 3) has a transmitter and sensing unit 74 which is connected by inlet (upstream) and outlet (downstream) tubes or pipes 70 and 72 to upstream and downstream plugs 76 and 78, respectively. The inlet, upstream plug 76 is inserted and can be threadedly engaged or welded to the inlet plug-receiving opening of the inlet flange. The outlet, downstream plug 78 is inserted and can be threadedly engaged or welded to the outlet plug-receiving opening of the outlet flange. The transmitter and sensor unit includes a diaphragm which detects and senses the differential pressure of the fluid stream passing through the orifice plate.

The inlet gasket 30 (FIG. 2) has an outer, rigid, metal inlet, upstream, centering ring 80 and an inner, compressible, spiral-wound, metallic, inlet, upstream gasket portion 82. The inlet centering ring has an outer circular edge 84, with a diameter less than the minimum diameter of the centers and inward portions of the stud holes of the inlet flange to avoid interference and contact with the fasteners which hold the flanges together. The inlet gasket portion 82 extends axially outwardly of the inlet centering ring and has an inlet, upstream gasket opening and hole 86 with a diameter slightly larger than the inside diameter of the inlet pipe. The inlet gasket portion has an inlet, downstream-facing, orifice plate-engaging surface 88 and an inlet, upstream, flange-engaging surface 90 which seals against and abuttingly engages the inlet gasket-engaging surface 44 of the inlet flange.

As shown in FIG. 2, the outlet gasket 32 has an outer rigid, metal outlet downstream, centering ring 92, and an inner, compressible, spiral wound, metallic outlet, downstream gasket portion 94. The outlet centering ring has an outer circular edge 96 with a diameter less than the minimum diameter of the centers and inward portions of the stud holes of the outlet flange to avoid interference and contact with the fasteners which hold the flanges together. The outlet gasket portion 94 extends axially outwardly of the outlet centering ring and has an outlet downstream gasket opening and hole 98 with a diameter slightly larger than the inside diameter of the outlet pipe. The outlet gasket portion has an inlet, upstreamfacing, orifice plate-engaging surface 100 and an outlet downstream, flange-engaging surface 102 which seals against and abuttingly engages the outlet gasket-engaging surface 56 of the outlet flange.

The inlet and outlet gasket portions can comprise spiral wound, V-shaped metal leaves in a binder or filler comprising asbestos, graphoil, polytetrafluorethylene (Teflon), or other material. Flexitallic-type gaskets can be used.

Figure 4:
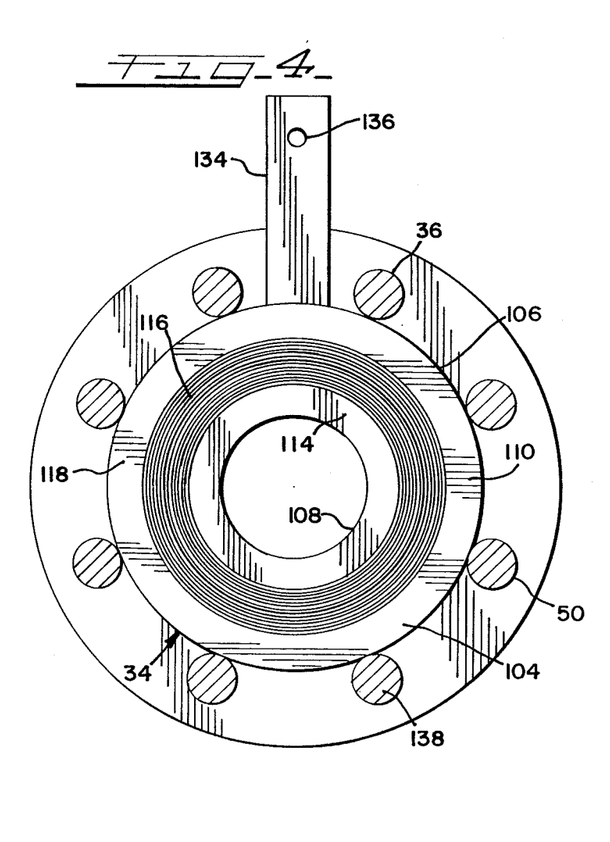
FIG. 4 is a cross-sectional front view of the orifice plate assembly taken substantially along line 4—4 of FIG. 2.
Figure 5:
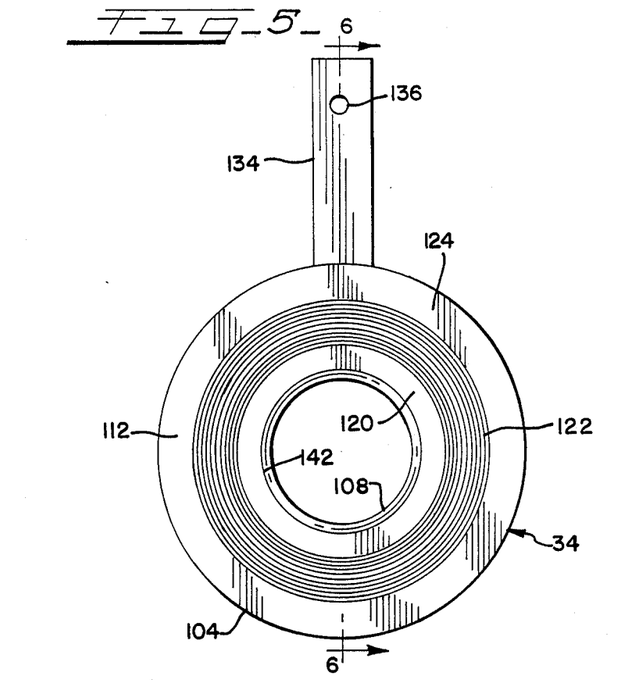
FIG. 5 is a back view of the orifice plate.

As shown in FIGS. 2, 4, and 5, the orifice plate comprises an annular, ring-shaped, planar or flat, solid metal disk 104. The disk is made of a rigid, fluid-impervious metal, such as stainless steel or other metal which is chemically inert to the fluid stream being passed through the orifice plate. The disk has a circular outer edge 106 and an inner flow passageway 108 through which the fluid in the pipes passes. The outer circular edges of the orifice plates and gaskets are similar in size. The inner flow passageway comprises a hole or opening with a cross-sectional area less than the transverse cross-sectional area of the inlet flow passageway of the inlet pipe as well as less than the transverse cross-sectional area of the outlet flow passageway of the outlet pipe. In the preferred embodiment, the inner flow passageway preferably comprises a circular hole or opening which is positioned concentrically about the center of the disk. The hole is positioned radially and concentrically inwardly of the outer circular edge of the disk. The disk 104 of the orifice plate has an upstream-facing, front inlet surface 110 and a downstream-facing, back inlet surface 112. The front inlet surface is positioned perpendicular to the flow of the oncoming fluid stream from the inlet pipe and provides an inlet fluid barrier and an upstream wall portion. The back inlet surface is positioned perpendicular to the flow of the fluid stream moving towards the outlet pipe and provides an outlet fluid barrier and downstream wall portion.

The front surface 110 (FIG. 4) of the orifice plate has annular inlet portions including an inner fluid stream-engaging inlet portion 114, an intermediate gasket-engaging inlet portion 116, and an outer centering ring-engaging inlet portion 118. The inner fluid stream-engaging portion 114 has a smooth polished surface finish ranging from 16 microinch to 32 microinch and is positioned concentrically about the center of the disk and the flow passageway to resistively contact the oncoming fluid stream. The intermediate gasket-engaging portion 116 has a rough, phonograph record-like surface finish ranging from about 125 microinch to about 500 microinch with a concentric set of grooves and ridges and is positioned radially outwardly and about the fluid stream-engaging inlet portion to seal against and abuttingly engage the inlet orifice plate-engaging surface 88 (FIG. 2) of the inlet gasket. The outer centering ring-engaging portion 118 is positioned radially outwardly and about the intermediate gasket-engaging portion to abut against and engage the centering ring of the inlet gasket. The outer centering ring-engaging portion is flat or planar with a surface finish similar to the fluid stream-engaging inlet portion.

The back surface 112 (FIG. 5) of the orifice plate has annular outlet portions including an outer fluid stream-engaging outlet portion 120, an intermediate gasket-engaging outlet portion 122, and an outer centering ring-engaging outlet portion 124. The outer fluid-engaging portion 120 has a smooth, polished surface finish ranging from about 16 microinch to about 32 microinch and is positioned concentrically about the center of the disk and the flow passageway to resistively contact at least some of the outgoing fluid stream exiting the flow passageway of the orifice plate. The intermediate gasket-engaging outlet portion 122 has a rough phonograph record-like surface finish ranging from about 125 microinch to about 500 microinch with a concentric set of grooves and ridges and is positioned radially outwardly and about the fluid stream-engaging outlet portion to seal against and abuttingly engage the outlet orifice plate-engaging surface 100 (FIG. 2) of the outlet gasket. The outer centering ring-engaging outlet portion 124 is positioned radially outwardly and about the intermediate gasket-engaging outlet portion to abut against and engage the centering ring of the outlet gasket. The outer centering ring-engaging outlet portion is flat or planar with a surface finish similar to the fluid stream-engaging outlet portion.

Figure 6:
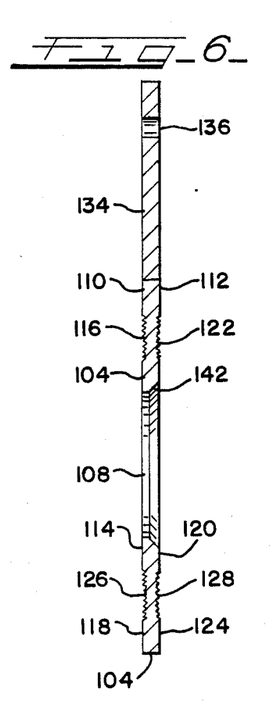
FIG. 6 is a cross-sectional side view of the orifice plate taken substantially along line 6—6 of FIG. 5.
Figure 7:
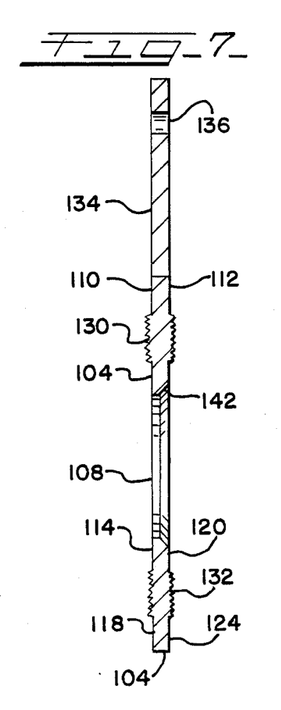
FIG. 7 is a view similar to FIG. 6 except with outwardly extending ridges.

In order to simplify machining operations and minimize manufacturing costs, the grooves 126 and 128 of the gasket-engaging portions of the orifice plate extend axially inwardly of the flat, fluid stream-engaging portions and flat centering ring-engaging portions of the orifice plate as shown in FIG. 6. The grooves can be cut on a lathe, such as with a cutting tool having a radius of 0.06 inch or larger, or by photochemical etching. A serrated-concentric or a serrated-spiral finish having from 24 to 40 grooves per inch and a 0.6 to 1 mm pitch can be used. If desired, the ridges 130 and 132 of the gasket-engaging portions of the orifice plate can extend axially outwardly of the flat fluid stream-engaging portions and flat centering ring-engaging portions of the orifice plate to provide raised ribs as shown in FIG. 7.

An elongated, manually grippable handle 134 extends radially outwardly from the disk beyond the inlet and outlet orifice flanges to facilitate gripping, handling, orientating, and positioning of the orifice plate. The handle can have identifying indicia stamped thereon and a hang hole or opening 136 near its unattached free end to receive a hook for hanging and storage.

The fasteners 36 (FIGS. 1–4) comprise elongated threaded studs 138 and nuts 140. The threaded studs are positioned through the stud holes of the inlet and outlet orifice flanges. The nuts threadedly engage the ends of the studs and are positioned against the flange portions of the orifice flanges. When tightened, the nuts compressively engage and secure the orifice flanges, gaskets, and orifice plates together. The fasteners also include jackscrews 139 and nuts 141 to help separate the orifice plate from the gaskets and orifice flanges during disassembly of the orifice plate assembly.

It was unexpectedly and surprisingly found during the installation and extensive use of dozens of test units in the Amoco Oil Refinery at Texas City, Tex., that the orifice plate assembly accurately sensed, measured, detected, and monitored the flow of hot hydrocarbon liquids, substantially above and below 500° F. without dripping, drainage, or other leakage of the hot hydrocarbon liquids.

The flow passageway 108 of the preferred embodiment is a circular hole positioned concentrically about the center of the disk and has a sharp chamfered edge 142 to decrease the radial fluid-resistant surface about the hole, minimize eddy currents and turbulence, and enhance the accuracy of detecting the flow rate of the fluid.

Figures 8, 9:
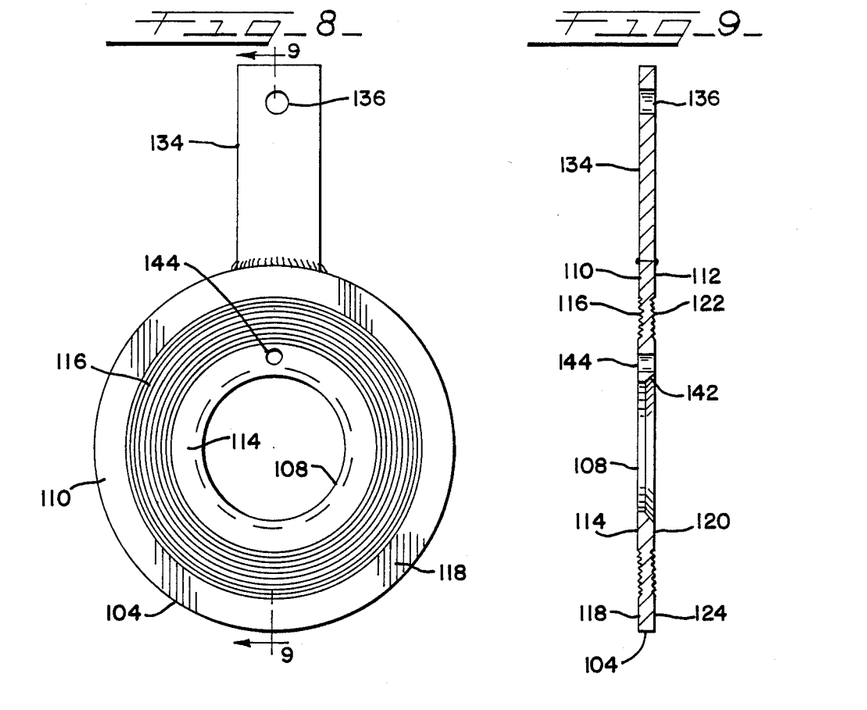
FIG. 8 is a front view of an orifice plate with a vent hole in accordance with principles of the present invention.
FIG. 9 is a cross-sectional side view of the orifice plate taken substantially along lines 9—9 of FIG. 8.

As shown in FIGS. 8 and 9, the orifice plate can have a smaller second circular hole 144 positioned above the concentric circular hole. The second hole can be positioned near the handle and provides a vent hole for passage of gases contained in the fluid stream.

Figures 10, 11:
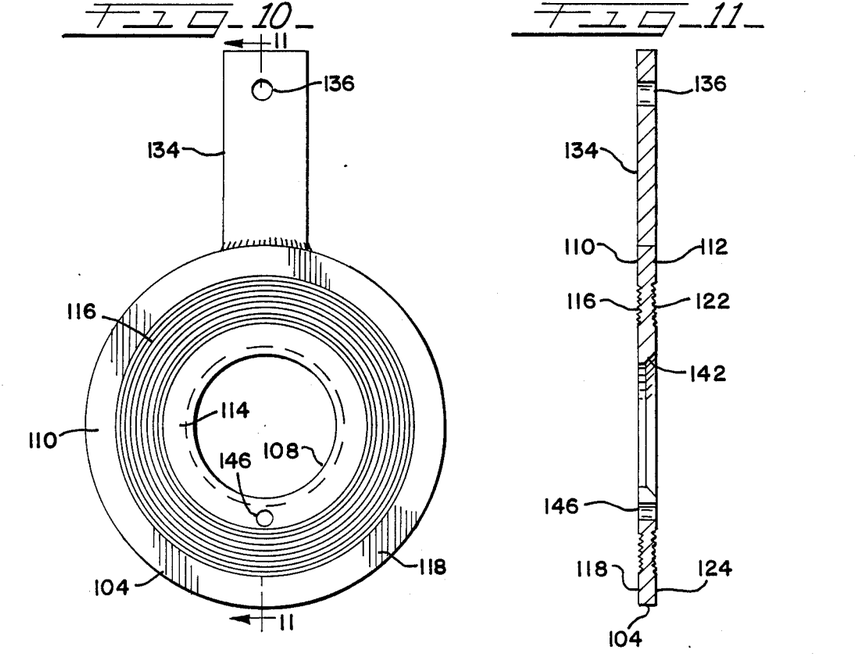
FIG. 10 is a front view of an orifice plate with a drain hole in accordance with principles of the present invention.
FIG. 11 is a cross-sectional side view of the orifice plate taken substantially along lines 11—11 of FIG. 10.

As shown in FIGS. 10 and 11, the orifice plate can contain a smaller second circular hole 146 positioned below the concentric circular hole. The smaller second hole is positioned diametrically away from the handle and comprises a drain hole for passage of solids, such as asphaltenic solids or other particulates, which may be contained in the fluid stream.

Figure 12:
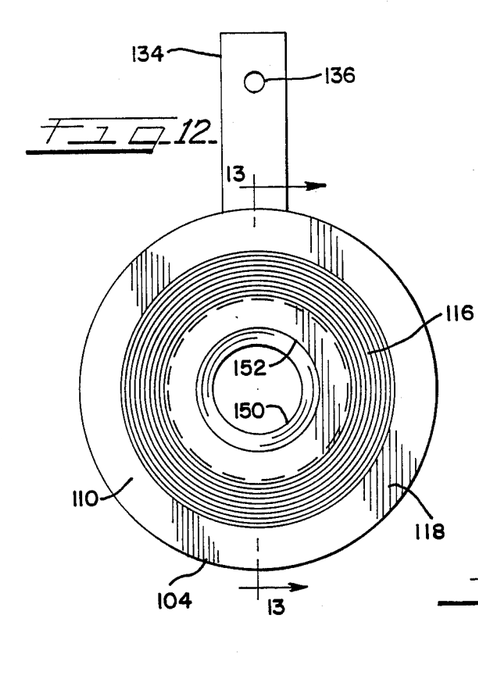
FIG. 12 is a front view of an orifice plate with a quadrant edge in accordance with principles of the present invention.
Figure 13:
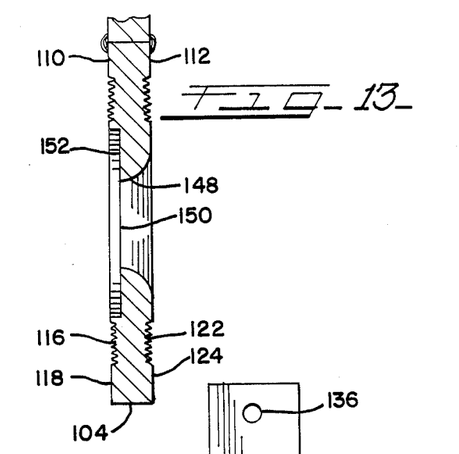
FIG. 13 is a cross-sectional side view of the orifice plate taken substantially along lines 13—13 of FIG. 12.

The quadrant edge orifice plate of FIGS. 12 and 13 has a convex, radiused, quadrant edge 148 positioned about and defining a circular flow passageway and opening 150. The flow passageway includes a large concentric counterbore 152 extending in the back surface of the orifice plate. The radiused quadrant edge provides a smooth recessed channeled inlet and sharp edge to facilitate better flow detection of highly viscous liquids, such as resid or vacuum towers bottoms.

Figure 14:
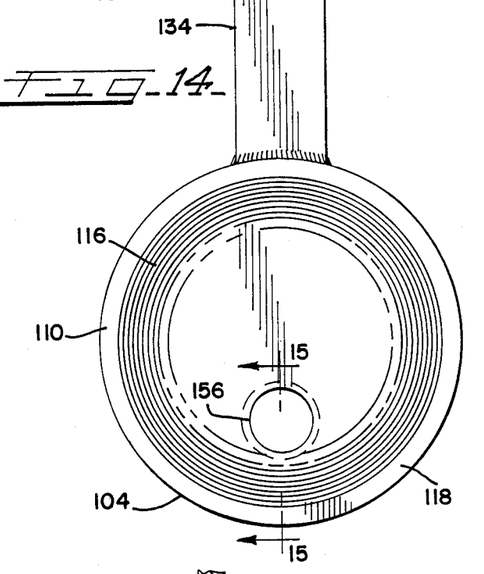
FIG. 14 is a front view of an orifice plate with an eccentric flow passageway in accordance with principles of the present invention.
Figure 15:
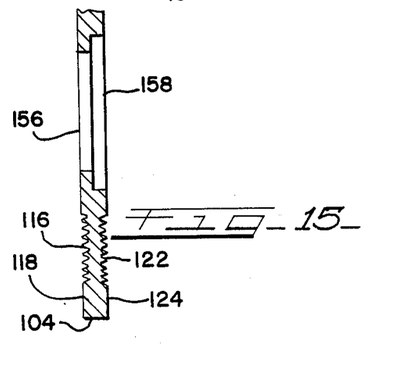
FIG. 15 is a cross-sectional side view of the orifice plate taken substantially along lines 15—15 of FIG. 14.

The flow passageway of the eccentric orifice plate of FIGS. 14 and 15 comprises an eccentric circular opening or hole 156 which is eccentrically positioned and radially offset from the center of the disk. The eccentric flow passageway (hole) is positioned below the center of the orifice plate at a location diametrically across from the handle to facilitate passage of solids, such as asphaltenic solids or other particulates which may be contained in the fluid stream. An enlarged counterbore 158 can extend inwardly in the back of the orifice plate above the eccentric opening to provide a sharper edge to contact the fluid. The eccentric orifice plate may also have an auxiliary vent hole above the eccentric flow passageway, similar to the vent hole of FIG. 8, for supplemental passage of gases.

Figure 16:
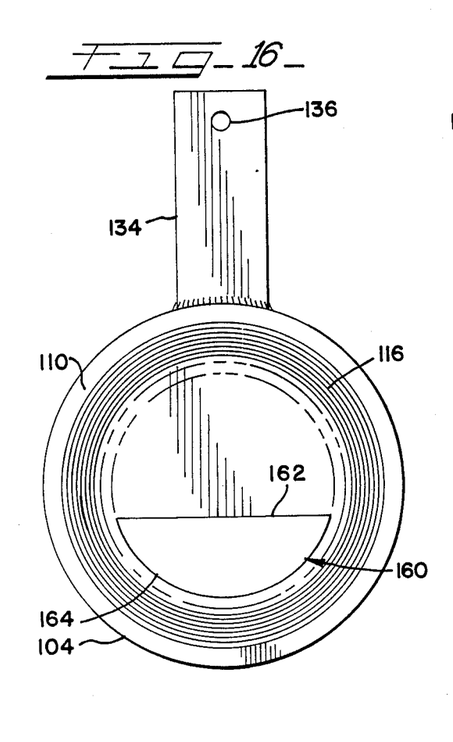
FIG. 16 is a front view of an orifice plate with an arcuate segmental flow passageway in accordance with principles of the present invention.

The flow passageway of the segmental orifice plate of FIG. 16 comprises an arcuate pie-shaped segmental opening (hole) 160, which is eccentrically positioned below and radially offset from the center of the disk to facilitate passage of highly viscous liquids or liquids which contain a large amount of solids, such as resid and vacuum tower bottoms. The arcuate segmental opening has a straight and linear horizontal top edge 162 and a concave bottom edge 164 which extends arcuately for about 140 degrees. The segmental orifice plate may also have an auxiliary vent hole above the arcuate segmental opening, similar to the vent hole of FIG. 8, for supplemental passage of gases.

Among the many advantages of the novel orifice plates and orifice plate assemblies described above are:
1. Improved efficiency and effectiveness.
2. Greater operability for hot liquid hydrocarbons and other fluid streams above 500° F.
3. Excellent flow detection and measurement.
4. Greater reliability.
5. Easy to use and install.
6. Improved environmental protection.
7. Less pollution and spillage.
8. Fewer toxic emissions.
9. Better prevention of explosions.
10. Enhanced safety.
11. Reduced maintenance.

Although embodiments of this invention have been shown and described, it is to be understood that various modifications and substitutions, as well as rearrangements and combinations of parts and equipment, can be made by those skilled in the art without departing from the novel spirit and scope of this invention.

What is claimed is:
1. An orifice plate assembly comprising:
a generally planar, solid metal disk having a generally circular outer edge and defining a flow passageway for passage of a fluid stream comprising liquid hydrocarbons at a temperature of at least 500° F.;
said disk having an upstream-facing front surface providing an upstream barrier and wall portion for positioning substantially perpendicular to said oncoming fluid stream of liquid hydrocarbons and a downstream-facing back surface positioned substantially parallel to said front surface;
said front surface having an inner substantially smooth fluid stream-engaging inlet portion positioned about and adjacent said flow passageway, an outer centering ring-engaging inlet portion positioned adjacent said circular outer edge, and a substantially rougher intermediate, annular gasket-engaging inlet portion positioned between said inner fluid stream-engaging inlet portion and said outer centering ring-engaging inlet portion, said inner fluid stream-engaging inlet portion positioned about said flow passageway for resistively contacting said fluid stream of hot hydrocarbons, said inner fluid stream-engaging inlet portion being generally annular and having a substantially planar finish ranging from about 16 microinch to about 32 microinch, said outer centering ring-engaging inlet portion being generally annular and having a substantially planar finish ranging from about 16 microinch to about 32 microinch, and said intermediate gasket-engaging inlet portion having a generally concentric set of grooves and ridges with a surface finish and roughness ranging from about 125 microinch to about 500 microinch for sealingly engaging and abutting against an upstream spiral wound metal gasket;
said back surface having an inner downstream outlet portion positioned about and adjacent said flow passageway, an outer centering ring-engaging outlet portion positioned adjacent said circular outer edge, and a substantially rougher intermediate, annular gasket-engaging outlet portion positioned between said inner downstream outlet portion and said outer centering ring-engaging outlet portion, said downstream outlet portion being substantially symmetrical, and aligned with said fluid stream-engaging portion and having a substantially planar finish ranging from about 16 microinch to about 32 microinch for contacting the downflowing fluid stream of hydrocarbons, said outer centering ring-engaging outlet portion being generally annular and having a substantially planar finish ranging from about 16 microinch to about 32 microinch, and said intermediate gasket-engaging outlet portion having a generally concentric set of grooves and ridges with a surface finish and roughness ranging from about 125 microinch to about 500 microinch for sealingly engaging and abutting against a downstream spiral wound metal gasket; and an elongated manually grippable handle extending radially outwardly from said disk for facilitating gripping of said orifice plate and having identifying indicia thereon.

2. An orifice plate assembly in accordance with claim 1 wherein said concentric set of ridges extend laterally outwardly of said outer centering ring-engaging portions.

3. An orifice plate assembly in accordance with claim 1 wherein said concentric set of grooves extend laterally inwardly of said outer centering ring-engaging portions.

4. An orifice plate assembly, comprising:

an inlet pipe having an inside diameter and defining an inlet axial passageway for passage of a fluid stream comprising liquid hydrocarbons at a temperature of at least 500° F.;

an outlet pipe having an inside diameter and defining an outlet axial passageway in communication with said inlet axial passageway of said inlet pipe, and said inside diameters of said inlet and outlet pipes being substantially similar in size;

an inlet orifice flange having an inlet hub and an inlet flange portion, said inlet hub extending integrally outwardly from said inlet flange portion in a direction generally opposite the direction of flow of said fluid stream in said inlet pipe and weldably secured to said inlet pipe, said inlet flange portion extending radially outwardly of said inlet hub and having an inlet gasket-engaging surface, said inlet flange portion defining at least one radial, inlet, plug-receiving opening and a set of inlet, circumferentially spaced, axial stud holes, and said inlet gasket-engaging surface facing downstream and having a grooved inlet surface finish ranging from about 125 microinch to about 500 microinch;

an outlet orifice flange having an outlet hub and an outlet flange portion, said outlet hub extending integrally outwardly from said outlet flange portion in a direction substantially similar to the direction of said fluid stream in said outlet pipe and weldably secured to said outlet pipe, said outlet flange portion extending radially outwardly of said outlet hub and having an outlet gasket-engaging surface, said outlet flange portion defining at least one radial, outlet, plug-receiving opening and a set of outlet, circumferentially spaced, axial stud holes aligned in registration with said inlet axial stud holes, and said outlet gasket-engaging surface facing upstream and having a grooved outlet surface finish ranging from about 125 microinch to about 500 microinch;

a differential pressure flow indicator comprising an electrical transmitter and a sensing unit connected to said electrical transmitter for sensing the differential pressure of the fluid passing through the flow passage of the orifice plate, said sensing unit including an inlet tube connected to an inlet plug positioned in said inlet plug-receiving opening of said inlet flange and an outlet tube connected to an outlet plug positioned in said outlet plug-receiving opening of said outlet flange;

an inlet gasket having an outer substantially rigid metal, inlet centering ring and an inner compressible, spiral wound, metallic, inlet gasket portion, said inlet centering ring having an outer edge with a diameter less than the minimum diameter of the centers of the stud holes of said inlet flange, said inlet gasket portion extending axially outwardly of said inlet centering ring and defining an inlet gasket opening having a diameter at least as large as the inside diameter of said inlet pipe, said inlet gasket portion having an inlet, downstream-facing, orifice plate-engaging surface and an inlet, flange-engaging surface with said inlet gasket portion sealingly engaging said inlet gasket-engaging surface of said inlet flange;

an outlet gasket having an outer substantially rigid, metal, outlet centering ring and an inner compressible, spiral wound, metallic outlet gasket portion, said outlet centering ring having an outer edge with a diameter less than the minimum diameter of the centers of the stud holes of said outlet flange, said outlet gasket portion extending axially outwardly of said outlet centering ring and defining an outlet gasket opening having a diameter at least as large as the inside diameter of said outlet pipe, said outlet gasket portion having an outlet, upstream-facing, orifice plate-engaging surface and an outlet, flange-engaging surface with said outlet gasket portion sealingly engaging said outlet gasket-engaging surface of said outlet flange;

an orifice plate comprising an annular, substantially planar, solid metal disk with a generally circular outer edge and an inner flow passageway, said circular outer edge having a diameter substantially similar to the maximum diameter of said centering rings, said inner flow passageway having a cross-sectional area less than the cross-sectional area of each said pipes, said disk having an upstream-facing, front inlet surface providing an inlet barrier and wall portion for positioning substantially perpendicular to the flow of the oncoming fluid stream from said inlet pipe and a downstream-facing, back inlet surface providing an outlet barrier and wall portion for positioning substantially perpendicular to the flow of the outgoing fluid stream exiting the flow passageway towards said outlet pipe, said front surface having a fluid stream-engaging inlet portion with a substantially smooth surface finish ranging from about 16 microinch to about 32 microinch positioned about said flow passageway for resistively contacting said oncoming fluid stream and an inlet gasket-engaging portion comprising a substantially rougher surface finish ranging from about 125 microinch to about 500 microinch with a substantially concentric set of grooves positioned about said fluid stream-engaging inlet portion for sealingly engaging said inlet orifice plate-engaging surface of said inlet gasket, said back surface having a fluid stream-engaging outlet portion with a substantially smooth surface finish ranging from about 16 microinch to about 32 microinch positioned about said flow passageway for resistively contacting at least some of the outgoing fluid stream and an outlet gasket-engaging portion comprising a substantially rougher surface finish ranging from about 125 microinch to about 500 microinch with a substantially concentric set of grooves positioned about said fluid stream-engaging outlet portion for sealingly engaging said outlet orifice plate-engaging surface of said outlet gasket, and an elongated, manually grippable handle extending radially outwardly from said disk beyond said orifice flanges for positioning and facilitating handling of said orifice plate; and fasteners comprising threaded studs positioned through said stud holes of said orifice flanges and nuts for threadedly engaging said studs against said flange portions to compressively engage and secure said orifice flanges, gaskets and orifice plates together to form said orifice plate assembly.

5. An orifice plate assembly in accordance with claim 4 wherein said handle has indicia thereon and defines a hook-receiving hole for storage.

6. An orifice plate assembly in accordance with claim 4 wherein said inner flow passageway of said orifice plate comprises a concentric hole positioned substantially concentrically about the center of said disk and substantially concentrically and radially inwardly of said outer circular edge of said disk.

7. An orifice plate assembly in accordance with claim 4 wherein said inner flow passageway of said orifice plate comprises an eccentric opening eccentrically positioned below and radially offset from the center of said disk.

8. An orifice plate assembly in accordance with claim 4 wherein said inner flow passageway of said orifice plate comprises and arcuate segmental opening.

9. An orifice plate assembly in accordance with claim 6 wherein said inner flow passageway further comprises a smaller second hole positioned radially and eccentrically outwardly of said concentric hole.

10. An orifice plate assembly in accordance with claim 9 wherein said second hole is positioned above said concentric hole and comprises a vent hole.

11. An orifice plate assembly in accordance with claim 9 wherein said second hole is positioned below said concentric hole and comprises a drain hole.

* * * * *

UNITED STATES PATENT OFFICE
CERTIFICATE OF CORRECTION

Patent No. 4,750,370          Dated June 14, 1988

Inventor(s) JOHN D. OSSYRA

It is certified that error appears in the above-identified patent and that said Letters Patent are hereby corrected as shown below:

| Col. | Line | | |
|------|------|---|---|
| 2 | 68 | "8." should be | -- 8; -- |
| 3 | 64 | "the the" should be | -- the -- |
| 5 | 8 | "upstreamfacing" should be | -- upstream-facing -- |
| 12 | 6 | "and" should be | -- an -- |

Signed and Sealed this

First Day of November, 1988

Attest:

DONALD J. QUIGG

Attesting Officer      Commissioner of Patents and Trademarks